United States Patent
Lu et al.

(10) Patent No.: US 12,140,711 B2
(45) Date of Patent: Nov. 12, 2024

(54) CONTROL OF OPTICAL RECEIVER BASED ON ENVIRONMENTAL CONDITION

(71) Applicant: Guangzhou Woya Laideling Technology Co. Ltd., Guangdong Province (CN)

(72) Inventors: Yue Lu, Mountain View, CA (US); Vipul Chawla, Mountain View, CA (US); Youmin Wang, Mountain View, CA (US)

(73) Assignee: Guangzhou Woya Laideling Technology Co., Ltd., Guangdong Province (CN)

( * ) Notice: Subject to any disclaimer, the term of this patent is extended or adjusted under 35 U.S.C. 154(b) by 986 days.

(21) Appl. No.: 17/073,073

(22) Filed: Oct. 16, 2020

(65) Prior Publication Data

US 2022/0120881 A1    Apr. 21, 2022

(51) Int. Cl.
| | |
|---|---|
| *G01S 7/487* | (2006.01) |
| *G01S 7/486* | (2020.01) |
| *G01S 7/4865* | (2020.01) |
| *G01S 7/4912* | (2020.01) |
| *G01S 17/08* | (2006.01) |

(52) U.S. Cl.
CPC ......... *G01S 7/4917* (2013.01); *G01S 7/4865* (2013.01); *G01S 7/4868* (2013.01); *G01S 7/487* (2013.01); *G01S 17/08* (2013.01)

(58) Field of Classification Search
CPC ........ G01S 7/4917; G01S 7/487; G01S 17/08; G01S 7/4868; G01S 7/4865; G01S 7/497
USPC ......................................................... 356/4.01
See application file for complete search history.

(56) References Cited

U.S. PATENT DOCUMENTS

| | | | |
|---|---|---|---|
| 7,157,685 B2 * | 1/2007 | Bamji ................... | G01S 7/4863 250/214 R |
| 9,529,079 B1 * | 12/2016 | Droz ...................... | G01S 7/484 |
| 2013/0076861 A1 * | 3/2013 | Sternklar ................ | G01S 17/32 348/46 |
| 2020/0150232 A1 * | 5/2020 | Liu .......................... | H03G 7/00 |

OTHER PUBLICATIONS

"Lookup table," Wikipedia 2023, downloaded Dec. 1, 2023 from https://en.wikipedia.org/wiki/Lookup_table, 7 pages. (Year: 2023).*

* cited by examiner

*Primary Examiner* — Daniel L Murphy
(74) *Attorney, Agent, or Firm* — Kilpatrick Townsend & Stockton LLP

(57) ABSTRACT

In one example, an apparatus is provided. The apparatus is part of a Light Detection and Ranging (LiDAR) module of a vehicle and comprises: a receiver circuit including a photodiode and an amplifier circuit; and a controller configured to: obtain information of an operation condition of the LiDAR module; based on the information, set a multiplication ratio by which the photodiode converts incident light to a photocurrent; obtain, from the amplifier circuit, an output signal based on the photocurrent; and perform a ranging operation based on the output signal.

13 Claims, 15 Drawing Sheets

| Ambient light intensity | Multiplication ratio |
|---|---|
| Light intensity 1 | Ratio 1 |
| Light intensity 2 | Ratio 2 |
| Light intensity 3 | Ratio 3 |

| Ambient light intensity | Revise bias voltage | Bias current |
|---|---|---|
| Light intensity 1 | Voltage 1 | Current 1 |
| Light intensity 2 | Voltage 2 | Current 2 |
| Light intensity 3 | Voltage 3 | Current 3 |
| ... | | |

| Noise signal power | Revise bias voltage | Bias current |
|---|---|---|
| Power 1 | Voltage 1 | Current 1 |
| Power 2 | Voltage 2 | Current 2 |
| Power 3 | Voltage 3 | Current 3 |

CONTROL OF OPTICAL RECEIVER BASED ON ENVIRONMENTAL CONDITION

BACKGROUND

Ranging operation generally refers to determining a distance between an observer (e.g., a vehicle) and an object. Ranging operation can be found in many applications, such as in a collision avoidance system of a vehicle, among many others.

Ranging operation can be performed using various techniques including, for example, measuring time-of-flight of signals propagating between the observer and the object. Specifically, a controller can control a transmitter to transmit a light signal at a first time. The signal can reach and reflected off the object to become a reflected signal, and the reflected signal can be detected by a receiver of the observer at a second time. The controller can process the output of the receiver to extract the reflected signal and record the second time. The controller can then determine a total time-of-flight of the signal based on the difference between the first time and the second time. Based on the speed of propagation of the signal, as well as the time-of-flight of the signal, the distance between the observer and the object can be determined. In some examples, the controller may control the transmitter to transmit multiple light signals to the object, and the receiver may receive multiple reflected signals from the object. In such a case, the time-of-flight and the distance can be determined based on the multiple times of transmission of the light signals and the multiple times of reception of the reflected signals.

Besides the reflected signals, noise signals, which may include signals received by the receiver that are not generated by the transmitter are and not used for the ranging operation, are typically present at the output of the receiver. There are various sources of noise signals. For example, ambient light present in the environment can be detected by the receiver and output as noise signals. As another example, there can be various electronic noises generated at the receiver irrespective of whether light is received, and the electronic noises can be output by the receiver as noise signals. If the noise signals have comparable signal power as the reflected signal, the controller may mistake the noise signals as the reflected signal, which can degrade the accuracy of the ranging operation.

BRIEF SUMMARY

In certain embodiments, an apparatus is provided. The apparatus is part of a Light Detection and Ranging (LiDAR) module of a vehicle and comprises: a receiver circuit including a photodiode and an amplifier circuit; and a controller configured to: obtain information of an operation condition of the LiDAR module; based on the information, set a multiplication ratio (sometimes referred to as a multiplication factor herein) by which the photodiode converts incident light to a photocurrent; obtain, from the amplifier circuit, an output signal based on the photocurrent; and perform a ranging operation based on the output signal.

In some aspects, the controller is further configured to: control a light source of the LiDAR module to transmit a first light signal; detect, from the output signal of the amplifier circuit, a second light signal reflected by an object from the first light signal; measure a time difference between when the first light signal is transmitted by the light source and when the second light signal is received by the receiver circuit; and determine a distance between the apparatus and the object based on the time difference.

In some aspects, the controller is further configured to: control a light source of the LiDAR module to transmit multiple first light signals; detect, from the output signal of the amplifier circuit, multiple second light signals reflected by an object from the multiple first light signals; measure multiple time differences between when the multiple first light signals are transmitted by the light source and when the multiple second light signals are received by the receiver circuit; and determine a distance between the apparatus and the object based on the multiple time differences.

In some aspects, the information of the operation condition comprises an ambient light intensity.

In some aspects, the controller is configured to set the multiplication ratio based on: setting the multiplication ratio to a first ratio based on the ambient light intensity within a first intensity range, and setting the multiplication ratio to a second ratio based on the ambient light intensity within a second intensity range. The first intensity range is lower than the second intensity range. The first ratio is larger than the second ratio.

In some aspects, the information of the operation condition comprises a power of noise signal components present in the output signal.

In some aspects, the controller has access to a mapping table that maps different operation conditions to different multiplication ratios. The controller is configured to retrieve the multiplication ratio from the mapping table based on the information.

In some aspects, each multiplication ratio in the mapping table is determined to achieve at least one of: a target signal-to-noise ratio (SNR) for the mapped operation condition, or a maximum SNR for the mapped operation condition.

In some aspects, the controller has access to a mapping table that maps different operation conditions to different settings of the photodiode, each setting corresponding to a multiplication ratio. The controller is configured to: retrieve a setting from the mapping table based on the information; and configure the receiver circuit based on the setting to set the multiplication ratio. In some aspects, the setting comprises at least one of: a reverse-biased voltage across the photodiode, or a bias current of the photodiode.

In some aspects, the controller is configured to obtain the information of the operation condition based on measuring a power of noise signal components present in the output signal.

In some aspects, the controller is configured to measure the power of the noise signal components present in the output signal based on measuring the output signal prior to when the light source transmits the first light signal or when the receiver receives the second light signal.

In some aspects, the controller is configured to obtain the information of the operation condition from one or more environment condition sensors.

In some aspects, the photodiode comprises at least one of: an avalanche photodiode (APD), a P-I-N diode, a single photodiode avalanche photodiode (SPAD), or a silicon photomultiplier (SiPM).

In certain embodiments, a method is provided. The method comprises: obtaining information of an operation condition of a Light Detection and Ranging (LiDAR) module; based on the information, setting a multiplication ratio by which a photodiode of a receiver circuit of the LiDAR module converts incident light to a photocurrent; obtaining, from an amplifier circuit of the receiver circuit, an output signal generated from the photocurrent; and performing a ranging operation based on the output signal.

In some aspects, the method further comprises: controlling a light source of the LiDAR module to transmit a first light signal; detecting, from the output signal of the amplifier circuit, a second light signal reflected by an object from the first light signal; and determining a distance between the LiDAR module and the object based on the first light signal and the second light signal.

In some aspects, the information of the operation condition comprises at least one of: an ambient light intensity, or a power of noise signal components present in the output signal.

In some aspects, setting the multiplication ratio comprises: setting the multiplication ratio to a first ratio based on the ambient light intensity within a first intensity range; and setting the multiplication ratio to a second ratio based on the ambient light intensity within a second intensity range. The first intensity range is lower than the second intensity range. The first ratio is larger than the second ratio.

In certain embodiments, a non-transitory computer-readable medium is provided. The medium stores instructions that, when executed by a hardware processor, causes the hardware processor to: obtain information of an operation condition of a Light Detection and Ranging (LiDAR) module; based on the information, set a multiplication ratio by which a photodiode of a receiver circuit of the LiDAR module converts incident light to a photocurrent; obtain, from an amplifier circuit of the receiver circuit, an output signal generated from the photocurrent; and perform a ranging operation based on the output signal.

In some aspects, the information of the operation condition comprises at least one of: an ambient light intensity, or a power of noise signal components present in the output signal.

BRIEF DESCRIPTION OF THE DRAWINGS

The detailed description is set forth with reference to the accompanying figures.

FIG. 4A, FIG. 4B, FIG. 4C, and FIG. 4D illustrate examples of internal components of a ranging system to mitigate effects of noise caused by environment conditions, according to examples of the present disclosure.

FIG. 5A, FIG. 5B, FIG. 5C, and FIG. 5D illustrate examples of internal components of the ranging system of FIG. 4A, according to examples of the present disclosure.

DETAILED DESCRIPTION

Figure 1:
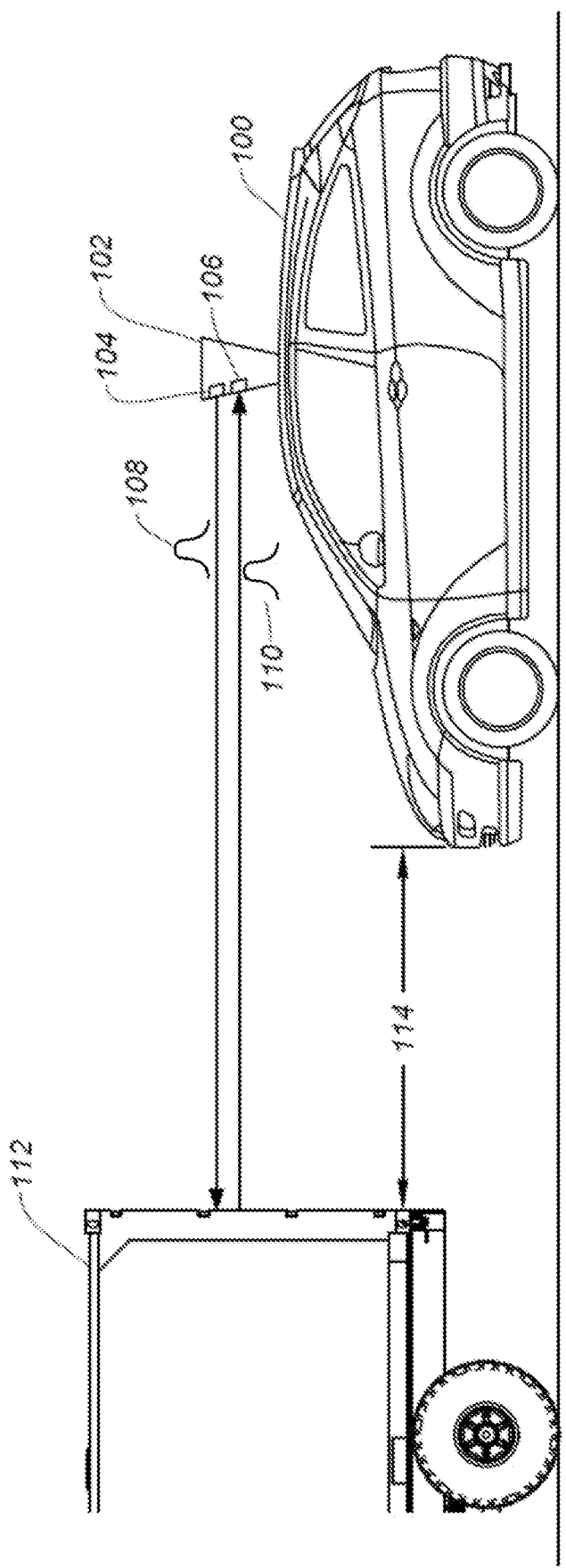
FIG. 1 shows an autonomous driving vehicle utilizing aspects of certain examples of the disclosed techniques herein.

In the following description, various examples of a ranging system will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

A ranging system, such as a Light Detection and Ranging (LiDAR) module, typically includes a transmitter, a receiver, and a controller. The transmitter may include, for example, a light source to transmit a varying light signal, such as a light pulse. The receiver may include a photodetector (e.g., photodiode) to generate a photocurrent based on the detected light signal, as well as an amplifier circuit to convert the photocurrent into a voltage output. The controller can control the transmitter to transmit a light signal, such as a light pulse, at a first time. The light signal can be reflected off an object to become a reflected signal. The receiver can detect the reflected signal at a second time and generate a voltage output including the reflected signal. The controller can extract the reflected signal from the voltage output, and determine the second time when the reflected signal is received by the receiver. The controller can determine a time-of-flight of the signal based on a difference between the first time and the second time, and determine a distance between the LiDAR module and the object based on the time-of-flight. In some examples, the controller may control the transmitter to transmit multiple light signals to the object, and the receiver may receive multiple reflected signals from the object. In such a case, the time-of-flight and the distance can be determined based on the multiple times of transmission of the light signals and the multiple times of reception of the reflected signals.

To improve the sensitivity of the receiver, a photodetector that employs a photocurrent multiplication mechanism, such as an avalanche photodiode (APD), a P-I-N diode, a single photodiode avalanche photodiode (SPAD), a silicon photomultiplier (SiPM), etc., can be used as part of the receiver. Specifically, a photodiode can generate electron-hole pairs as the incident light energy is greater than the band gap energy of the photodiode, and the magnitude of the photocurrent can be related to the incident light intensity/power based on a responsivity of the photodiode. In a case where the photodetector employs a photocurrent multiplication mechanism, however, the magnitude of the photocurrent can be amplified by a multiplication factor, which allows the photodetector to generate a relatively large quantity of photocurrent for low-intensity incident light, thereby improving the receiver's sensitivity. There are various types of photocurrent multiplication mechanisms. For example, an avalanche photodiode can be reverse-biased to perform an avalanche multiplication operation, in which the electron-hole pairs generated due to the incident light energy can collide with the crystal lattice within the photodiode, which leads to ionization of the crystal lattice. As a result of the ionization, additional electron-hole pairs and additional photocurrent can be created, which leads to the photocurrent output by the avalanche photodiode being amplified by the multiplication ratio. The multiplication ratio of the photodiode can depend on various factors, such as a magnitude of a reverse-bias voltage by the photodiode which sets an electric-field across the p-n junction, a bias current of the photodiode which can introduce a voltage difference across finite resistance of the photodiode and set the reverse-bias voltage, etc.

The sensitivity of the receiver, however, can be degraded by noise signals. The noise signals generally include signals that are not part of the reflected signal and should not be used for the ranging operation. There are various sources of noise signals, such as noise signals generated by the photodetector from ambient light, as well as electronic noise in the amplifier. Specifically, the avalanche multiplication operation in the photodiode can introduce noise signals as the ionization is not uniform and can fluctuate, leading to multiplication noise (also known as "excess noise"). The multiplication noise can be generated by amplifying a photocurrent current generated from ambient light (as well as from other sources not related to the reflected signal, such as dark current) by the multiplication ratio as part of the avalanche multiplication operation, as well as by a noise factor which increases with the multiplication ratio. In addition, the amplifier may include circuit components, such as transistors and resistors, which can generate electronic noises including thermal noise, shot noise, etc. The multiplication noise as well as the electronic noise can add up to become noise signals which can be output by the receiver.

If the signal power of the noise signals becomes comparable to the signal power of the reflected signal, the controller may mistake the noise signals as the reflected signal and use the time of reception of the noise signal for the ranging operation. The accuracy of the ranging operation can be degraded as a result. Therefore, a key performance metrics of the receiver, and the LiDAR module as a whole, is the signal-to-noise ratio (SNR). The SNR of the receiver can be measured as a ratio between a signal power of the return pulse and a signal power of the total noise signals at the input or output of the receiver. A higher SNR may indicate a huge difference between the signal power of the reflected signal and the signal power of the noise signals, which makes it more likely that the controller can correctly distinguish the reflected signal from the noise signals and use the reflected signal to perform the ranging operation. On the other hand, a lower SNR may indicate that the signal power of the reflected signal is similar to the signal power of the noise signals. This can make it more likely that the controller confuses the noise signals with the reflected signal, or that the reflected signal becomes masked by and indistinguishable from the noise signals, especially in a case where the reflected signal is from a faraway object and has undergone substantial attenuation en route to the receiver. In such a case, the controller may erroneously use the noise signal as the reflected signal to perform the ranging operation, or cannot perform the ranging operation at all from the output of the receiver. The accuracy of the ranging operation can become degraded as a result.

A LiDAR module typically has a fixed configuration for the receiver for simplicity. For example, in a case where the photodetector of the receiver includes an avalanche photodiode, the bias current and the reverse-bias voltage across the avalanche photodiode can be set at fixed values to, for example, maximize the multiplication ratio, in order to maximize the sensitivity of the receiver. Such arrangements, however, can degrade the SNR of the receiver under certain operation conditions. For example, as described above, a photodiode can generate a multiplication noise by amplifying a photocurrent from ambient light by the multiplication factor and by the noise factor. Therefore, increasing the multiplication ratio can increase the signal power of the multiplication noise component by a larger proportion than that of the reflected signal component in the receiver output.

The multiplication ratio can affect the SNR differently in different operation conditions. For example, in a case where the LiDAR module operates in a strong ambient light environment or otherwise the total noise signal power is dominated by the multiplication noise, maximizing the multiplication ratio can increase the total noise signal power by a larger proportion than the reflected signal power, which can degrade the SNR. In such a case, it is desirable to have a low multiplication ratio to reduce the total noise signal power. On the other hand, in a case where the LiDAR module operates in a weak ambient light environment and/or where the electronic noise dominates the total noise signal power, the total noise power may remain largely constant regardless of the multiplication ratio. In such a case, maximizing the multiplication ratio is desirable to increase the reflected signal power, while the total noise power stays largely constant, and the SNR can be improved. Meanwhile, setting the multiplication ratio at a middle value does not minimize the total noise signal power in the strong ambient light operation condition, nor does it maximize the reflected signal power in the weak ambient light operation condition, which can lead to a suboptimal SNR across different operation conditions. Thus, adopting a one-size-fits-all approach in the configuration of the receiver, such as configuring the photodiode to have a constant multiplication ratio across different operation conditions, can lead to suboptimal noise performance.

Conceptual Overview of Certain Embodiments

Figure 4A:
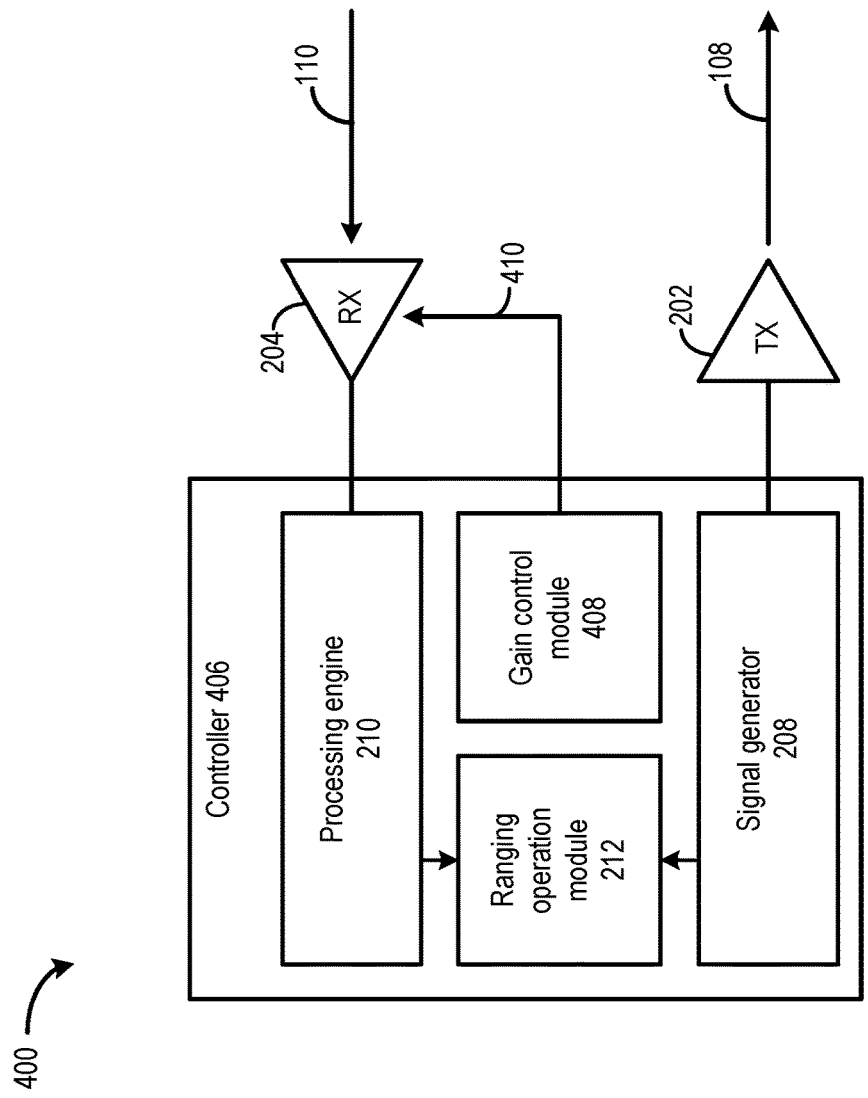

Examples of the present disclosure relate to a ranging system, such as a LiDAR module, that can address the problems described above. Examples of the LiDAR module and its internal components are illustrated in FIG. 4A-FIG. 5D. As shown in FIG. 4A, an example LiDAR module includes a transmitter, a receiver, and a controller. The transmitter may include, for example, a light source to transmit a varying light signal, such as a light pulse. The receiver may include a photodetector, such as an avalanche photodiode, that converts detected light to a photocurrent according to a multiplication ratio set by the controller, as well as an amplifier circuit to convert the photocurrent into a voltage output. The controller can include a gain control module and a ranging operation module. The gain control module can obtain information of an operation condition of the LiDAR module, and set the multiplication ratio of the photodetector based on the information. As part of the ranging operation, the controller can control the transmitter to transmit the light pulse at a first time, and extract from the voltage output of the amplifier circuit, a return pulse from an object received by the photodetector at a second time. The ranging operation can then determine a distance between the LiDAR module and the object based on the first time and the second time.

Specifically, the information of operation condition may indicate, for example, an intensity of the ambient light received by the receiver. The operation condition may reflect the relative contributions of the photodetector's multiplication noise and the amplifier circuit's electronic noise to the total noise at the output of the receiver, which in turn can signal whether the multiplication ratio of the photodiode should be increased or decreased. For example, in a case where the LiDAR module operates in a strong ambient light environment, the total noise signal power at the receiver output may be dominated by the multiplication noise of the photodetector, and the multiplication ratio can be decreased to reduce the total noise signal power and to improve SNR.

Based on the operation condition, the gain control module can set the multiplication ratio of the photodetector. For example, referring to FIG. 4C, the gain control module can include a mapping table that maps different multiplication ratios to different operation conditions such as different ambient light intensities. Based on the information of the operation condition of the LiDAR module, the gain control module can refer to the mapping table to retrieve the multiplication ratio setting, and set the multiplication ratio based on the retrieved setting. Each multiplication ratio in the mapping table can be designed to, for example, achieve a target total noise signal power or a target SNR, achieve a minimum total noise signal power or a maximum SNR for the corresponding operation condition. The setting of the multiplication ratio can be based on, for example, setting a reversed-bias voltage across the photodiode, a bias current of the photodiode, etc. In some examples, as shown in FIG. 4D, the mapping table can map different operation conditions to different photodetector settings (e.g., different reverse-biased voltages and/or bias currents), such that the gain control module can directly retrieve a particular photodetector setting based on the operation condition and configure the photodetector using the retrieved photodetector setting.

Figure 5A:
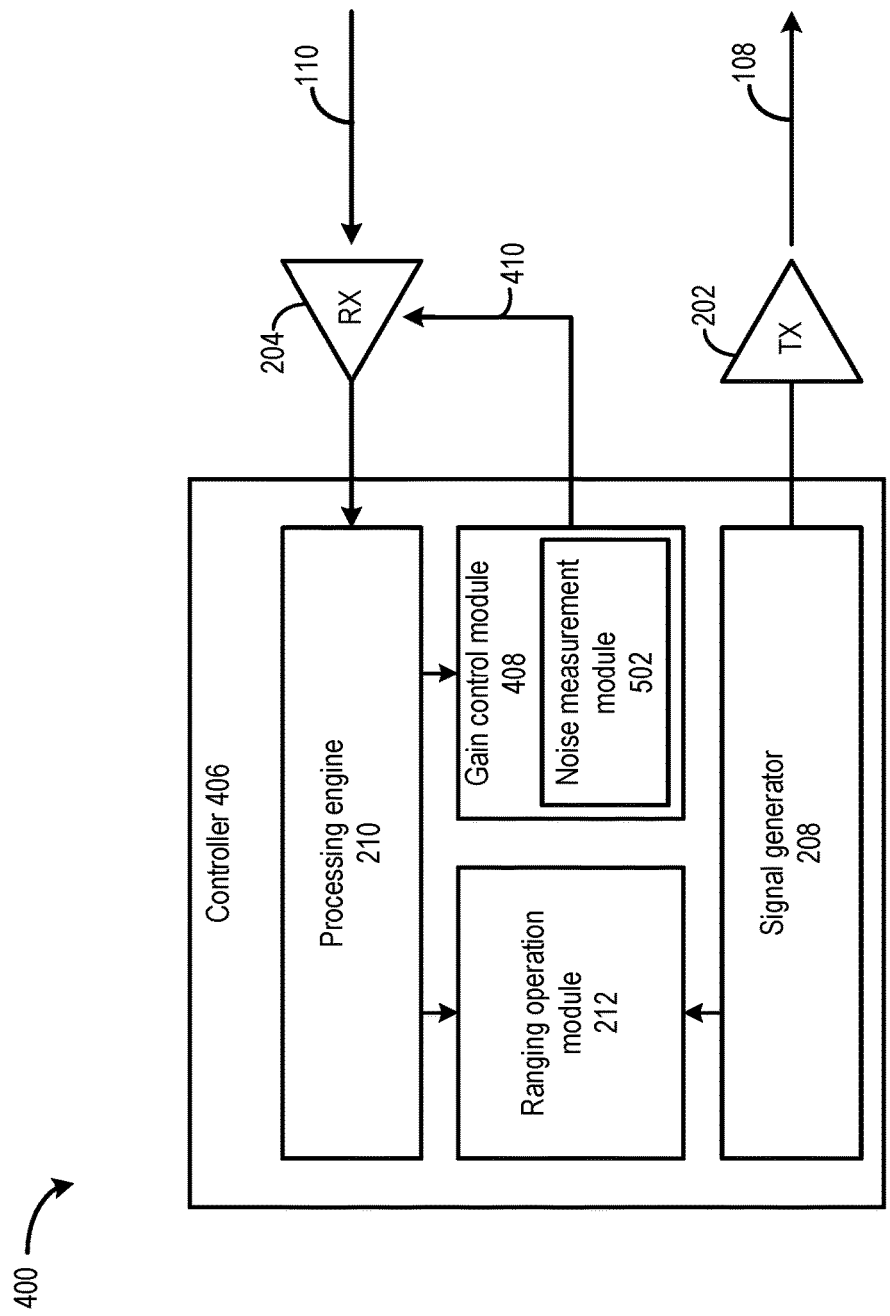
Figure 5B:
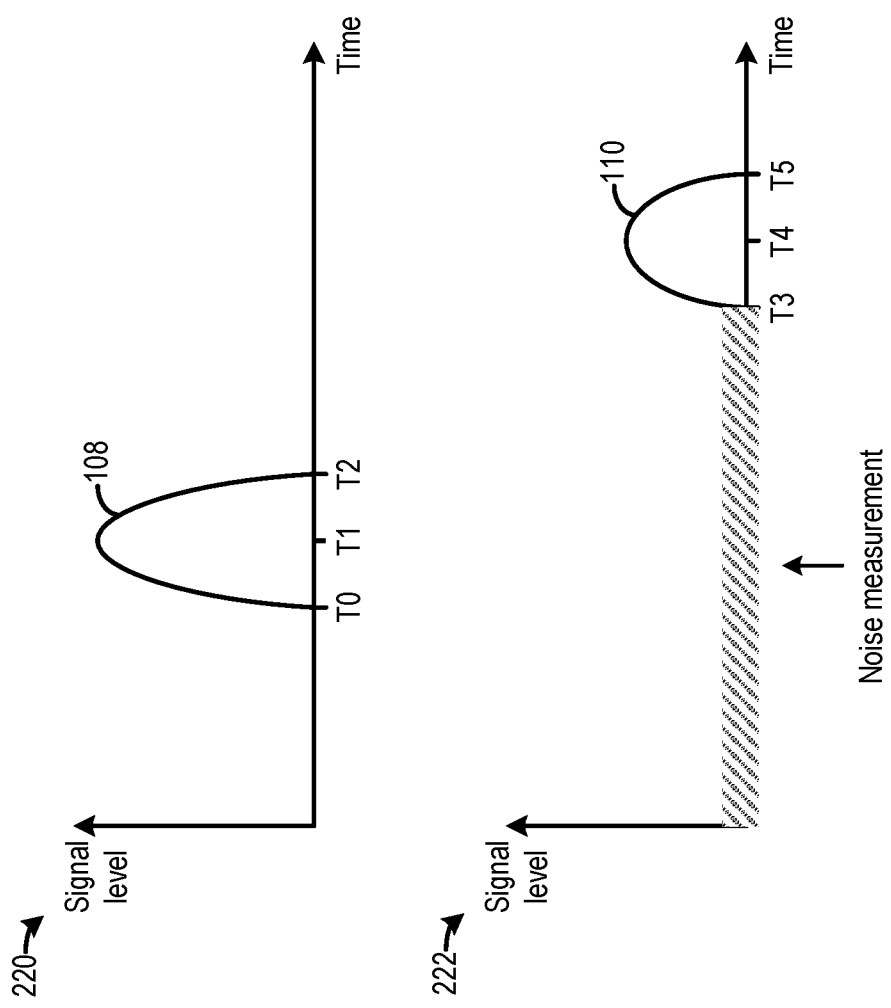

There are various ways by which the gain control module obtains the information of the operation condition. In one example, as shown in FIG. 5A and FIG. 5B, the gain control module can measure the noise signal power at the receiver output, which can reflect the ambient light intensity. The gain control module can measure the noise signal power based on measuring the signal power of the receiver output prior to, for example, the transmitter transmitting the light pulse, the receiver receiving the return pulse, etc., such that the receiver output does not include the return pulse and only include the noise signal. The gain control module can then determine the multiplication noise power of the noise signal by subtracting away a predetermined estimate of the electronic noise. The gain control module can then infer the ambient light intensity from the multiplication noise power, and retrieve the photodetector setting from the mapping table based on the inferred ambient light intensity. In some examples, as shown in FIG. 5C, the mapping table can map different multiplication noise signal powers (or different total noise signal powers) to different photodetector settings, such that the gain control module can directly retrieve a particular photodetector setting based on the noise signal power measured from the receiver output.

Figure 5D:
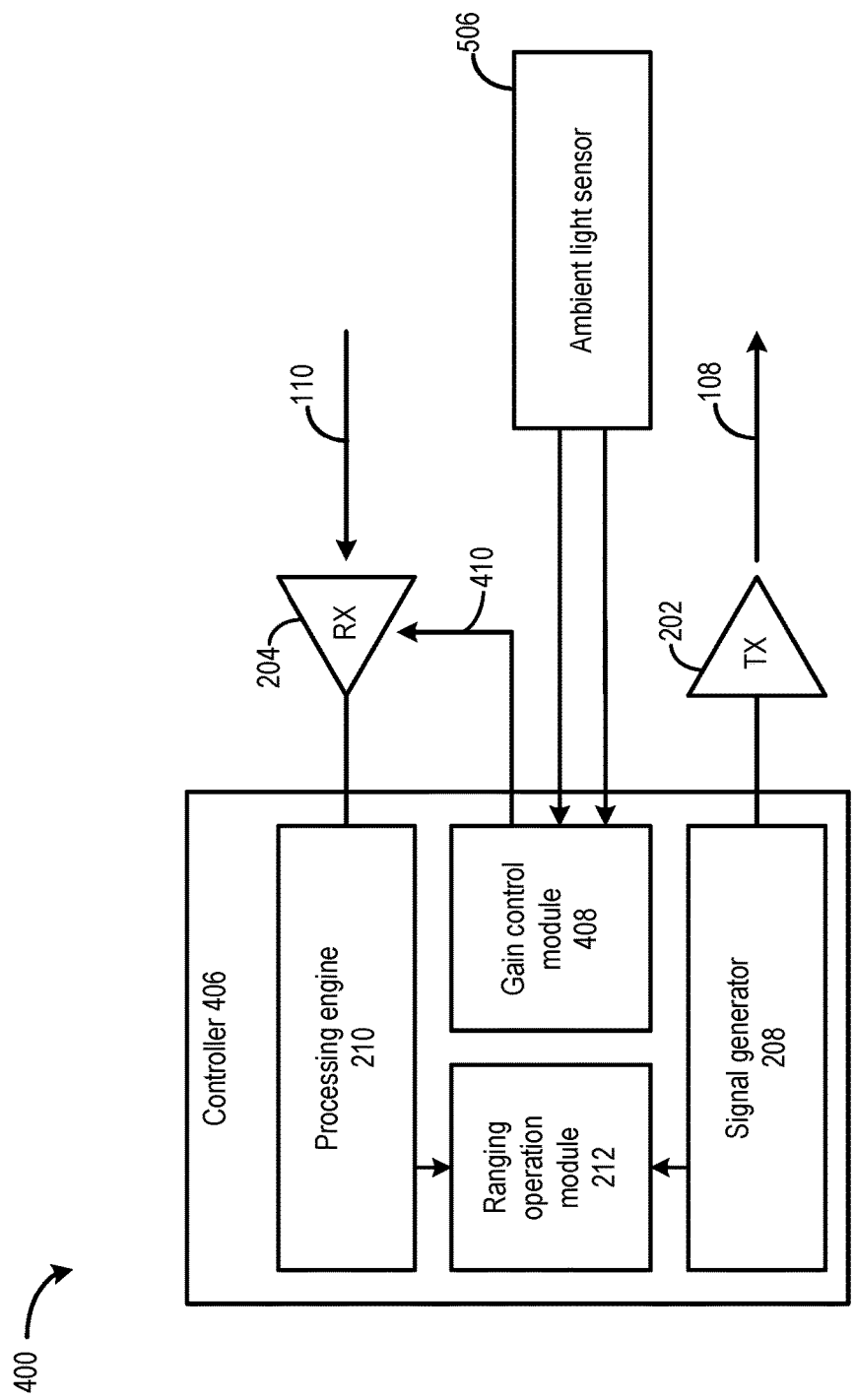

In addition, as shown in FIG. 5D, in some examples the controller can also be coupled with an ambient light sensor. From the ambient light sensor, the gain control module can obtain measurements of the ambient light intensity, and retrieve the photodetector setting from the mapping tables of FIG. 4C and FIG. 4D based on the measurements.

With the disclosed embodiments, the LiDAR module can dynamically adjust the configuration of the receiver, such as the multiplication ratio of the avalanche photodiode or any other photodetector that employs a photocurrent multiplication mechanism, based on the operation condition. The multiplication ratio can be increased when it is advantageous for certain operation conditions where the multiplication noise is just a small part of the total noise (e.g., when there is weak ambient light), such that increasing the multiplication ratio can increase the reflected signal power by a larger proportion than the noise signal power. The multiplication ratio can be decreased when it is advantageous for a different set of operation conditions where the multiplication noise dominates the total noise (e.g., when there is strong ambient light), such that decreasing the multiplication ratio can decrease the noise signal power by a larger proportion than the reflected signal power. By dynamically adjusting the multiplication ratio based on the operating condition, the receiver can maintain a high SNR across different operation conditions, which can improve the robustness of the LiDAR module.

Typical System Environment for Certain Embodiments

FIG. 1 illustrates an autonomous vehicle 100 in which the disclosed techniques can be implemented. Autonomous vehicle 100 includes a ranging system, such as LiDAR module 102. LiDAR module 102 allows autonomous vehicle 100 to perform object detection and ranging in a surrounding environment. Based on the result of object detection and ranging, autonomous vehicle 100 can maneuver to avoid a collision with the object. LiDAR module 102 can include a light steering transmitter 104 and a receiver 106. Light steering transmitter 104 can project one or more light signals 108 at various directions at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, an amplitude modulated continuous wave (AMCW) signal, etc. LiDAR module 102 can detect the object based on the reception of light pulse 110, and can perform a ranging determination (e.g., measuring a distance of the object) based on a time difference between light signals 108 and 110. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can adjust its speed (e.g., slowing or stopping) to avoid collision with object 112 based on the detection and ranging of object 112 by LiDAR module 102.

Figure 2A:
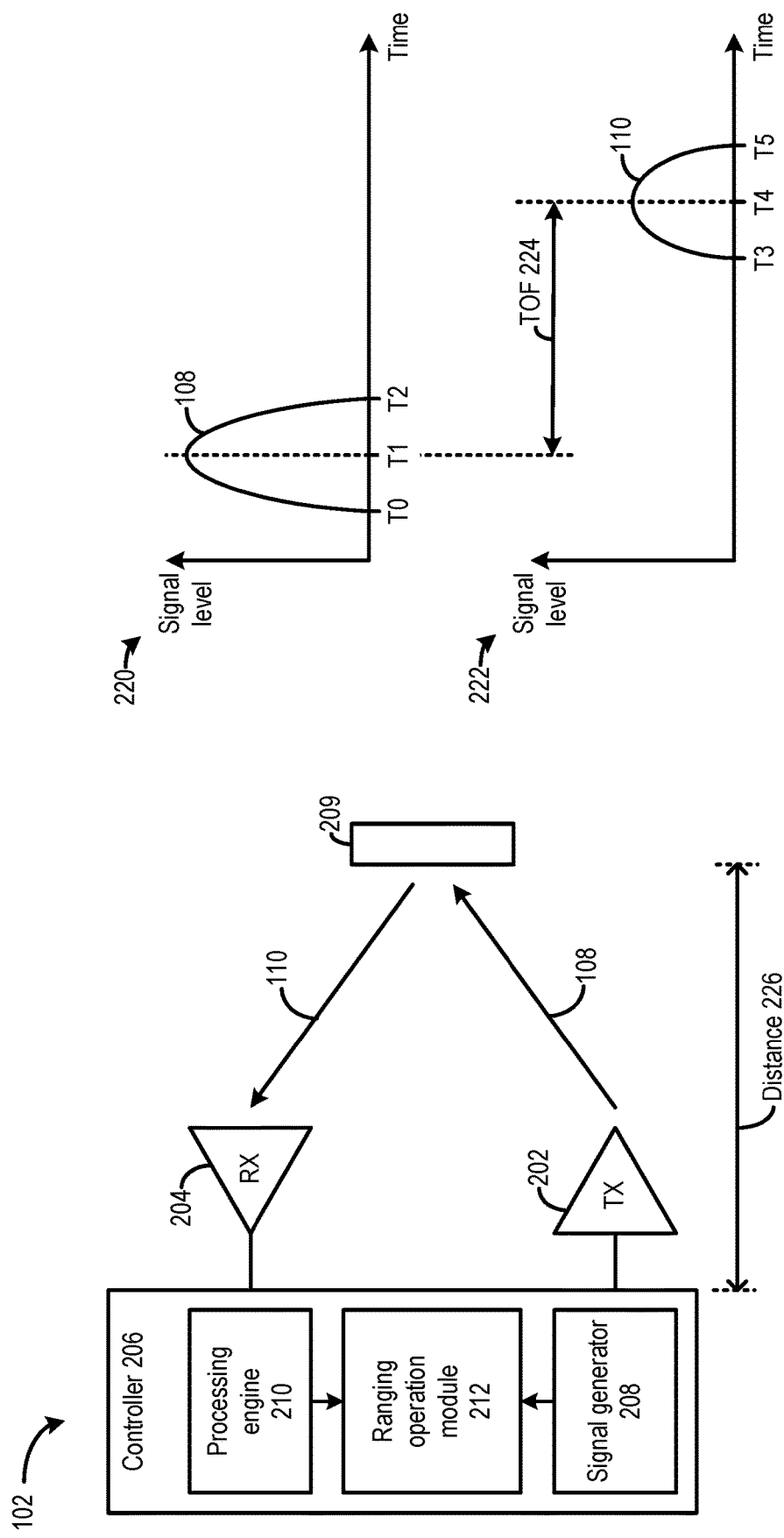
FIG. 2A and FIG. 2B illustrate examples of a ranging system that can be part of FIG. 1.

FIG. 2A illustrates examples of components of a LiDAR module 102. LiDAR module 102 includes a transmitter 202, a receiver 204, and a controller 206. Transmitter 202 may include a light source (e.g., a pulsed laser diode, a source of FMCW signal, a source of AMCW signal, etc.) to transmit light signal 108. Controller 206 includes a signal generator 208 which can determine the amplitude characteristics of light signal 108, as well as the time when transmitter 202 transmits light signal 108. Light signal 108 can propagate to and reflected off target object 209 to form reflected light signal 110. Receiver 204 can detect the reflected light signal 110 together with other signals.

Graphs 220 and 222 illustrate examples of light signal 108 and reflected light signal 110. Referring to graph 220 of FIG. 2A, which shows the output of transmitter 202 with respect to time, signal generator 208 can control transmitter 202 to transmit light signal 108 between times T0 and T2, with light signal 108 peaking at time T1. Light signal 108 can be reflected off target object 209 to become reflected signal 110. Referring to graph 222 of FIG. 2A, which shows the input signals at receiver 204 with respect to time, receiver 204 can receive light signals including reflected signal 110. Receiver 204 can include a photodetector (e.g., a photodiode) which can convert received photons into a photocurrent to represent the received light signals. Processing engine 210 may include a digital signal processor (DSP) to perform the signal processing operations on the received signals. The signal processing operations may include, for example, determining a pattern of changes of the signal level with respect to time, such as an amplitude envelop shape or other amplitude characteristics, of the receive signals. In some examples, processing engine 210 may include a matched filter to detect the presence of reflected signal 110 in the received signals. As another example, the processing may include Fast Fourier Transform (FFT) to extract frequency contents of the received signals, to determine whether the received signals include reflected signal 110.

Controller 206 further includes a ranging operation module 212. Ranging operation module 212 can identify reflected signal 110 from the received signals based on the outputs of processing engine 210, and perform a ranging operation (e.g., distance measurement, reflectivity measurement, etc.) based on the identified reflected signal 110. For example, ranging operation module 212 can collect the amplitude characteristics and/or frequency contents information of transmitted light signal 108 and received signals from, respectively, signal generator 208 and processing engine 210, and perform a search for reflected light signal 110 in the received signals. The search can be based on, for example, identifying a signal having amplitude characteristics and/or frequency contents that are scaled copies of amplitude characteristics and/or frequency contents of transmitted light signal 108. Referring to graph 222, ranging operation module 212 may identify the received signals between times T3 and T5 as reflected signal 110 based on the received signals having the same amplitude envelop shape as transmitted light signal 108.

Ranging operation module 212 can perform a ranging operation based on reflected signal 110. The ranging operation may include, for example, distance measurement. For distance measurement, ranging operation module 212 can determine a time difference between transmitted light signal 108 and reflected light signal 110 to represent time-of-flight (TOF) 224 of light signal 108 between LiDAR module 102 and target object 209. The time difference can be measured between, for example, time T1 when light signal 108 peaks and time T6 when reflected light signal 110 peaks. Based on time-of-flight 224 and speed of propagation of light signals, ranging operation module 212 can determine a distance 226 between LiDAR module 102 and target object 209.

As described above, to perform a correct ranging operation, ranging operation module 212 needs to correctly identify a reflected signal of a previously-transmitted light signal to determine a time-of-flight between the signals and/or a ratio of their signal levels. There are various sources that can introduce errors to the identification of the reflected signals. One source of error can be noise signals in the environment, such as ambient light. The receiver may receive ambient light reflected off the object and identify the ambient light as a reflected signal from a previously-transmitted light signal. Ranging operation module 212 can reduce the risk of false identification of noise signals as reflected signals based on, for example, matching the amplitude characteristics and/or frequency contents of the received signals with the previously-transmitted light signal (e.g., light signal 108).

Figure 2B:
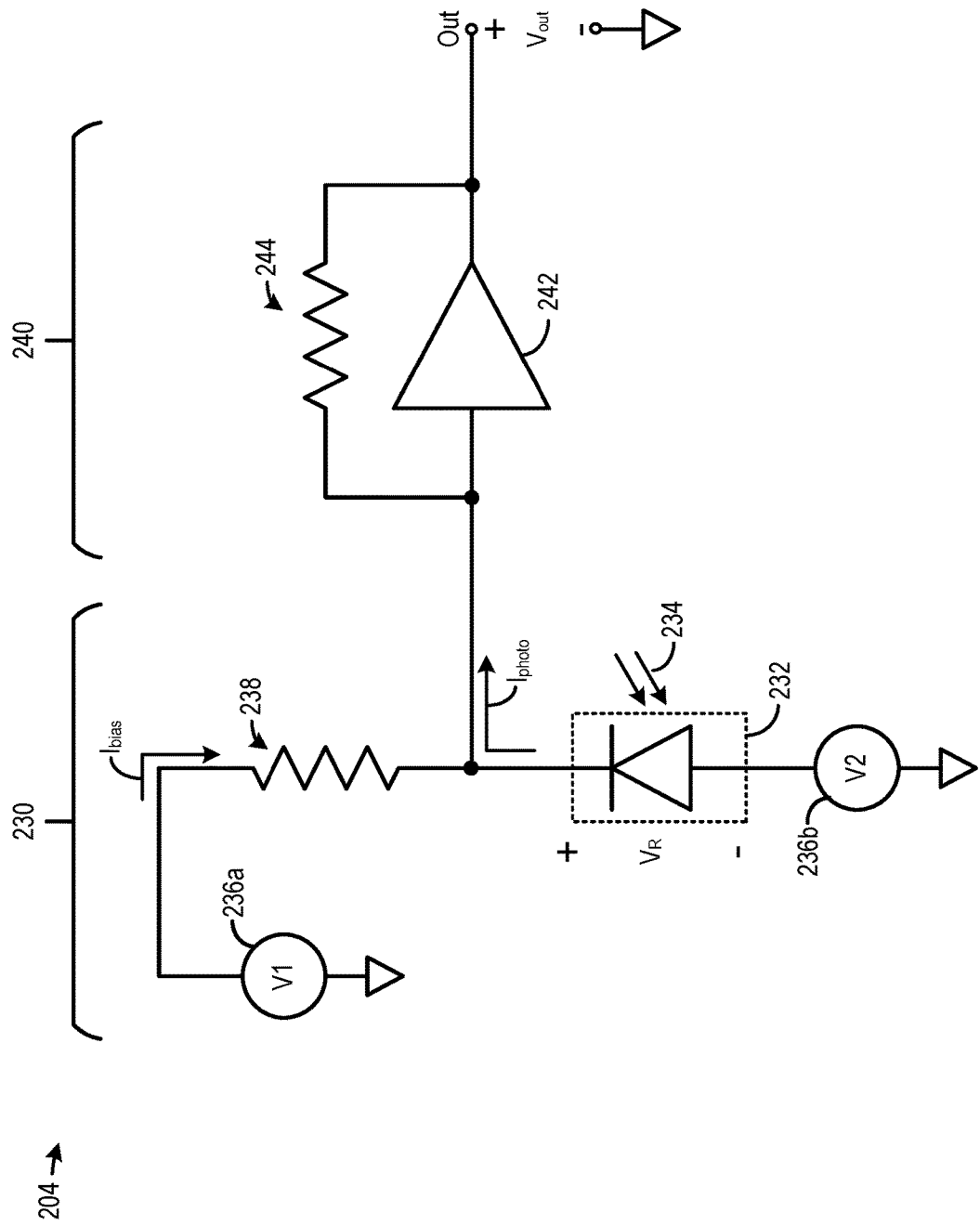

FIG. 2B illustrates an example of internal components of receiver 204. As shown in FIG. 2B, receiver 204 can include a photodetector 230 and an amplifier circuit 240. Photodetector 230 can include a photodiode 232 to generate a photocurrent (labelled "$I_{photo}$") based on detecting a light signal 234. Photodetector 230 further includes circuits such as voltage sources 236a and 236b, as well as resistor 238, to set a reversed-bias voltage $V_R$ across photodiode 232 and to provide a bias current (labelled "$I_{bias}$") that flows through photodiode 232. The output voltage of voltage source 236a (labelled "V1"), as well as resistor 238 and bias current $I_{bias}$, can determine the voltage at the cathode of photodiode 232, whereas the output voltage of voltage source 236b (labelled "V2") can determine the voltage at the anode of photodiode 232. The voltages at the cathode and the anode of photodiode 232 can set the reverse-bias voltage $V_R$ across photodiode 232. The reverse-bias voltage can form a depletion region (layer) at the P-N junction of photodiode 232. When light is incident upon the P-N junction, if the incident light energy exceeds the band gap energy of the P-N junction, electron-hole pairs can be generated at the depletion layer. The electrons and holes can be swept by the electric-field created by the reverse-bias voltage towards, respectively, the cathode and the anode to form the photocurrent. The number of electron-hole pairs, as well as the magnitude of the photocurrent, can be related to the incident light intensity/power based on a responsivity of the photodiode.

In addition, amplifier circuit 240 can include an amplifier 242 and a resistor 244. Amplifier 242 and a feedback resistor 244 can form a transimpedance amplifier (TIA). The TIA enables the photocurrent $I_{photo}$ to flow through resistor 244 to develop an output voltage (labelled "$V_{out}$") which is largely linearly related to photocurrent $I_{photo}$. In a case where photodiode 232 receives light signal 110, the output voltage $V_{out}$ can have a similar amplitude envelop shape as light signal 110.

To improve the sensitivity of receiver 204, a photodetector that employs a photocurrent multiplication mechanism, such as an avalanche photodiode (APD), a P-I-N diode, a single photodiode avalanche photodiode (SPAD), or a silicon photomultiplier (SiPM), can be used as photodiode 232. As described above, a typical photodiode generates a photocurrent of which the magnitude is related to the incident light intensity/power, based on the responsivity of the photodiode. In a case where the photodetector employs a photocurrent multiplication mechanism, however, the magnitude of the photocurrent can be further amplified by a multiplication factor (ratio) M, which allows the photodetector to generate a relatively large quantity of photocurrent for low-intensity incident light, thereby improving the receiver's sensitivity. There are various types of photocurrent multiplication mechanisms. For example, an avalanche photodiode can be reverse-biased at $V_R$ (by voltage sources 236a and 236b and resistor 238) to perform an avalanche multiplication operation, in which the electron-hole pairs generated due to the incident light energy can be swept by the electric-field created by the reverse-bias voltage. As the reverse-bias voltage increases, a larger electric-field can be introduced, which causes the electron-hole pairs to drift at a higher speed and make it more likely for these charge carriers to collide with the crystal lattice within the photodiode. The collision can lead to ionization of the crystal lattice, which creates additional electron-hole pairs and additional photocurrent. As a result, the photocurrent output by the avalanche photodiode can be amplified by the multiplication factor M. The multiplication ratio M of the photodiode can depend on various factors, such as a magnitude of a reverse-bias voltage the photodiode which sets an electric-field across the p-n junction, a bias current of the photodiode which can introduce a voltage difference across finite resistance of the photodiode and set the reverse-bias voltage.

Figure 3A:
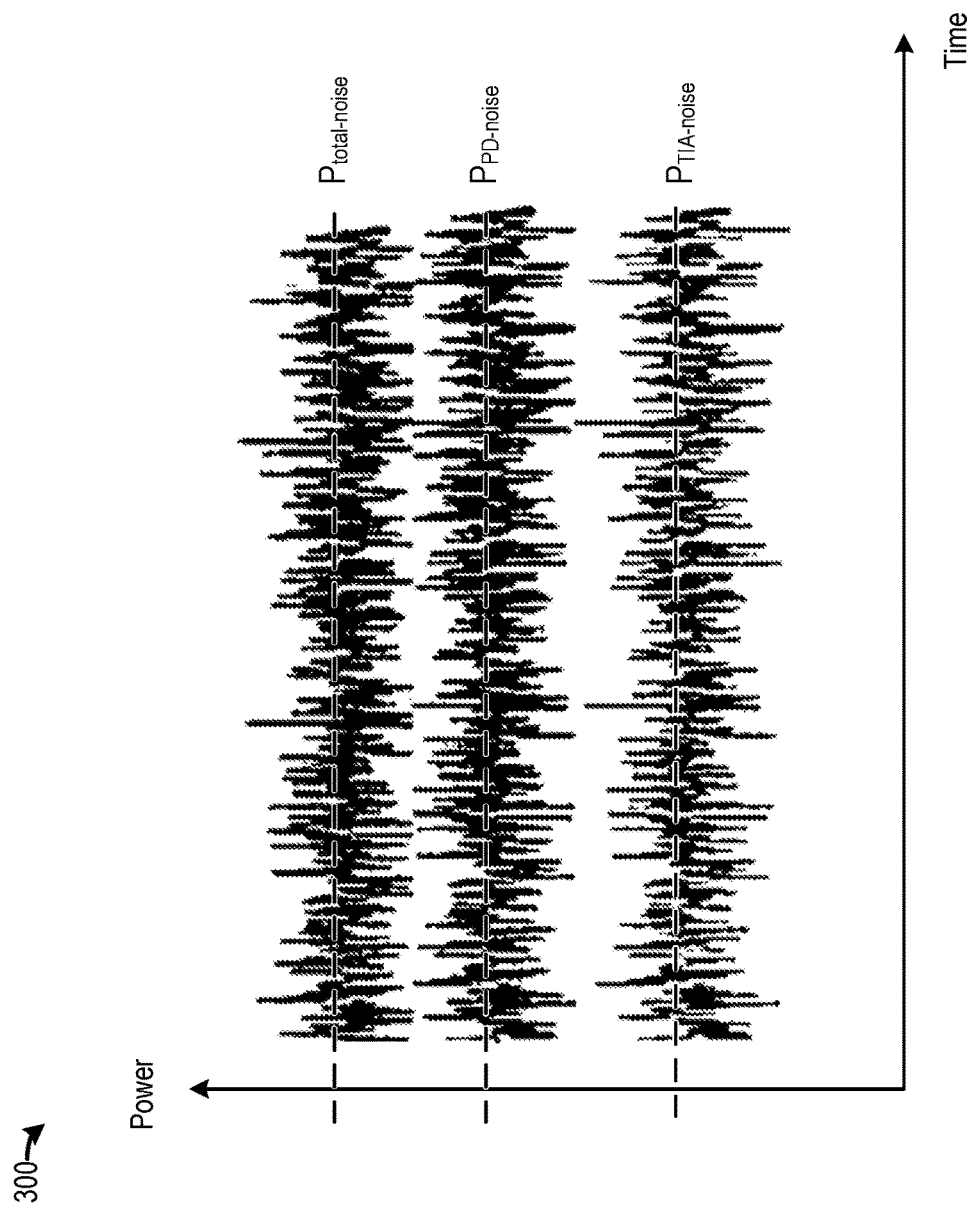
FIG. 3A and FIG. 3B illustrate example effects of noise on the ranging system of FIG. 1.

The sensitivity of the receiver, however, can be degraded by noise signals present at the receiver output. The noise signals generally include signals output by the receiver that are not part of the return signal and should not be used for the ranging operation. FIG. 3A illustrates a graph 300 of signal powers of various sources of noise signals, such as noise signals generated by the photodetector from ambient light, as well as electronic noise in the amplifier. Specifically, the avalanche multiplication operation in the photodiode can introduce noise signals, as the ionization is not uniform and can fluctuate, leading to multiplication noise (also known as "excess noise"). The multiplication noise can be generated by amplifying a photocurrent current generated from ambient light, as well as from other sources not related to the return signal, such as dark current, by the multiplication ratio as part of the avalanche multiplication operation, as well as by a noise factor which increases with the multiplication ratio.

In Equation 2: $P_{PD-noise}$ refers to the signal power of the multiplication noise signal of photodiode 232; q refers to the electron charge; whereas $P_{non-sig}$ refers to the signal power of any signal that causes the photodiode to generate photocurrent but not related to the reflected signal to be detected including, for example, ambient light. Moreover, R refers to the responsivity, M refers to the multiplication factor, whereas F refers to the noise factor. The noise factor F can be a function of multiplication factor M as follows:

$$F=M^x. \qquad \text{(Equation 3)}$$

If the signal power of the noise signals becomes comparable to the signal power of the reflected signal, the controller may mistake the noise signals as the return signal and use the time of reception of the noise signal for the ranging operation. The accuracy of the ranging operation can be degraded as a result. Therefore, a key performance metrics of the receiver, and the LiDAR module as a whole, is the signal-to-noise ratio (SNR). The SNR of the receiver can be measured as a ratio between a signal power of the reflected pulse and a signal power of the total noise signals. The SNR can be measured at, for example, the input or output of amplifier 240.

Figure 3B:
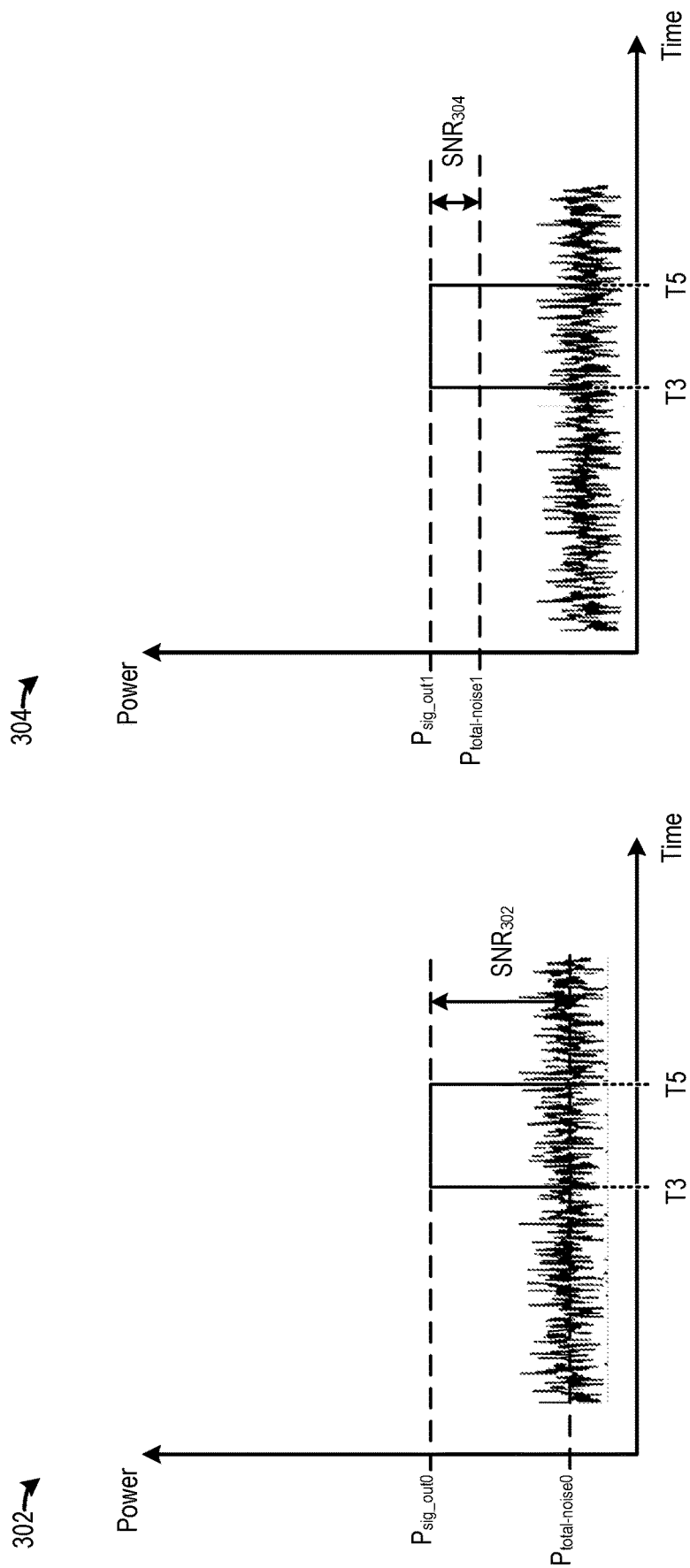

FIG. 3B illustrates graphs 302 and 304 showing different SNRs. In graph 302, the input-referred noise signal, at the input of amplifier 240, has a power of $P_{total-noise0}$, whereas the photodiode output power, corresponding to reflected light signal 110 received between times T3 and T5, has a power of $P_{sig\_out0}$. On the other hand, in graph 304, the input-referred noise signal, at the input of amplifier 240, has a power of $P_{total-noise1}$, whereas the photodiode output power, corresponding to reflected light signal 110 received between times T3 and T5, has a power of $P_{sig\_out1}$. The SNR between noise signal and reflected signal in graph 302 (labelled $SNR_{302}$) is much higher than the SNR in graph 304 (labelled $SNR_{304}$), which can be due to the reflected light signal power $P_{sig\_out1}$ in graph 304 being lower than the $P_{sig\_out0}$ in graph 302, the noise power $P_{total-noise1}$ in graph 304 being higher than the $P_{total-noise0}$ in graph 302, or both.

A higher SNR may indicate a huge difference between the signal power of the return signal and the signal power of the noise signals, which makes it more likely that the controller can correctly distinguish the reflected light signal from the noise signals and use the actual reflected light signal to perform the ranging operation. On the other hand, a lower SNR may indicate that the signal power of the reflected light signal is similar to the signal power of the noise signals. This can make it more likely that the controller confuses the noise signals with the reflected light signal, or that the reflected light signal becomes masked by and indistinguishable from the noise signals, especially in a case where the reflected light signal is from a faraway object and has undergone substantial attenuation en route to the receiver. In FIG. 3B, due to low $SNR_{304}$, it becomes easier for the controller to confuse the noise signals with reflected light signal in the scenario depicted in graph 304. The accuracy of the ranging operation can become degraded as a result.

LiDAR module 102 typically has a fixed configuration for the receiver for simplicity. For example, referring back to FIG. 2B, the output voltages V1 and V2 of voltage sources 236a and 236b, as well as bias current $I_{bias}$, are typically fixed to set a fixed reversed bias $V_R$. On the other hand, the fixed reversed bias $V_R$ can be set to a value to, for example, maximize the multiplication ratio, in order to maximize the sensitivity of the receiver. Such arrangements, however, can degrade the SNR of the receiver under certain operation conditions.

From Equation 7, it can be seen that increasing the multiplication ratio M can reduce SNR, which is undesirable. Therefore, in a case where the LiDAR module operates in a strong ambient light environment, or otherwise, the total noise signal power is dominated by the multiplication noise, and it is advantageous to keep the multiplication ration low.

From Equation 8, it can be seen that the total noise power is mostly constant regardless of the multiplication ratio. In such a case, increasing the multiplication ratio M can increase the received signal power as well as the SNR, which is desirable.

Meanwhile, setting the multiplication ratio at a middle value does not minimize the total noise signal power in the strong ambient light operation condition (as the multiplication ratio should be lower to increase SNR), nor does it maximize the return signal power in the weak ambient light operation condition (as the multiplication ration should be higher to increase SNR). As a result, the receiver may have a suboptimal SNR and noise performance across different operation conditions.

FIG. 4A-FIG. 4D illustrate examples of LiDAR module 400 that can address the problems described above. As shown in FIG. 4A, LiDAR module 400 includes transmitter 202 and receiver 204 of FIG. 2A, as well as a controller 406. Transmitter 202 may transmit light signal 108, whereas receiver 204 can detect the reflected light signal 110. Controller 406 includes signal generator 208 to determine the amplitude characteristics and time of transmission of light signal 108, processing engine 210 to detect reflected light signal 110 from the output of receiver 204, as well as ranging operation module 212 to perform a ranging operation based on identified reflected signal 110.

Figure 4B:
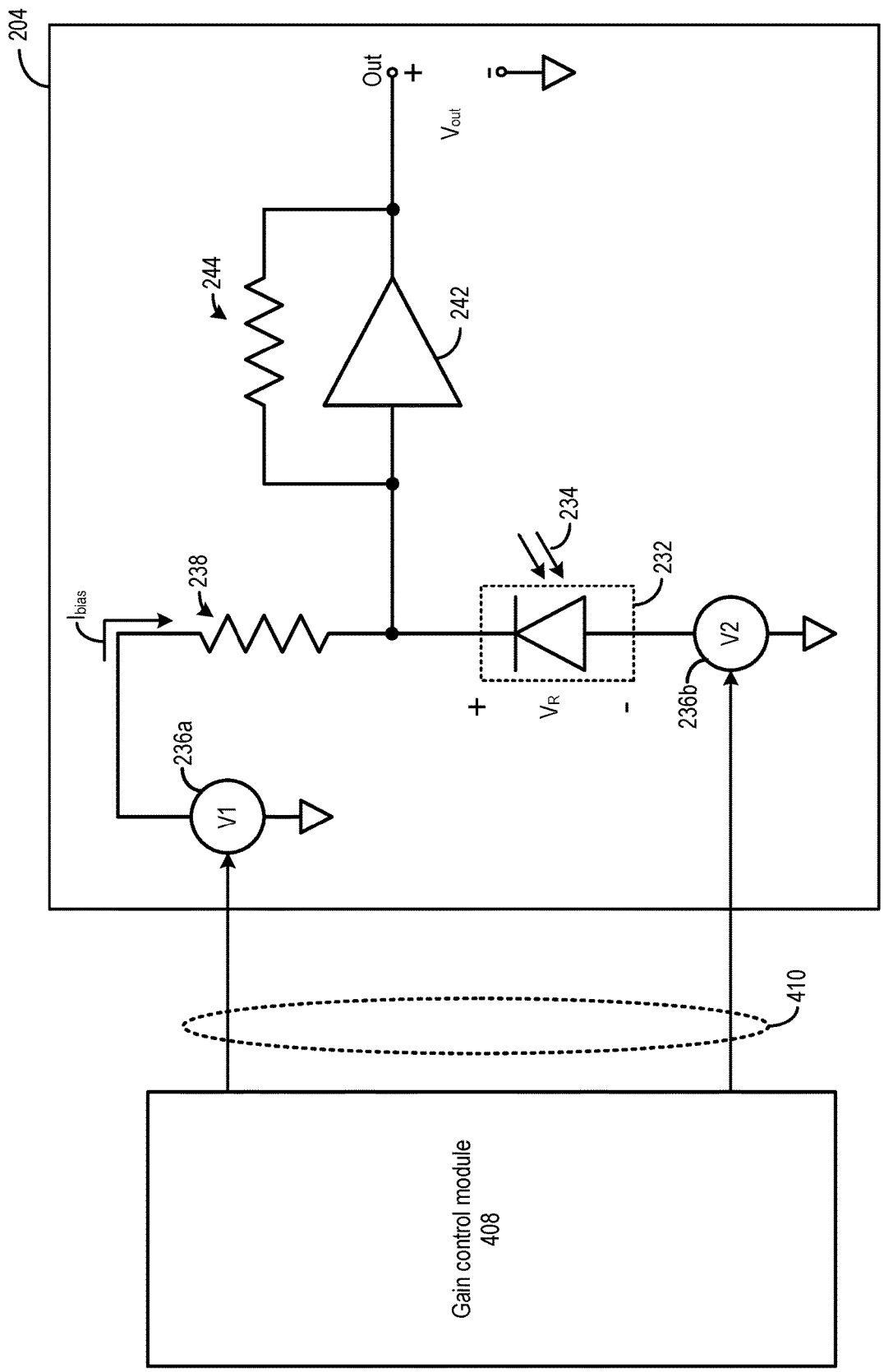

In addition, controller 406 further includes a gain control module 408. Gain control module 408 can obtain information of an operation condition of LiDAR module 400, and adjust configuration 410 of receiver 204 based on the information. In a case where receiver 204 includes a photodetector that employs a photocurrent multiplication mechanism, such as an avalanche photodiode (APD), a P-I-N diode, a single photodiode avalanche photodiode (SPAD), or a silicon photomultiplier (SiPM), configuration 410 can set a multiplication ratio of the photodetector. Referring to FIG. 4B, configuration 410 can set the multiplication ratio of the photodiode based on setting, for example, voltage V1 output by voltage source 236a, voltage V2 output by voltage source 236b, and/or bias current $I_{bias}$.

The information of an operation condition of LiDAR module 400 may indicate, for example, an intensity of the ambient light received by the receiver, which can affect the relative contributions of the photodetector's multiplication noise and the amplifier circuit's electronic noise to the total noise at the output of the receiver, which in turn can signal whether the multiplication ratio is to be increased or decreased. As explained above, in a case where the LiDAR module operates in a strong ambient light environment, the total noise signal power at the receiver output may be dominated by the multiplication noise of the photodetector.

In such a case, reducing the multiplication ratio can improve the SNR as the total noise signal power can be reduced by a larger proportion than the reflected signal power. On the other hand, in a case where LiDAR module 400 operates in a low ambient light environment, the total noise signal power at the receiver output may be dominated by the electronic noise of the amplifier circuit. In such a case, increasing the multiplication ratio can improve the SNR as the reflected signal power can be increased while the total noise signal power (dominated by the electronic noise) remains unaffected by the multiplication ratio.

In some examples, gain control module 408 may include a mapping table that maps different operation conditions to different multiplication ratios. FIG. 4C illustrates an example of mapping table 420. In mapping table 420, different multiplication ratios (e.g., ratio 1, ratio 2, or ratio 3) are mapped to different operation conditions. Each operation condition can include a particular ambient light intensity (e.g., light intensity 1, light intensity 2, or light intensity 3). Based on the information of the operation condition, gain control module 408 can refer to mapping table 420 to retrieve the multiplication ratio setting, and set the multiplication ratio of photodiode 232 based on the retrieved setting. Each multiplication ratio in mapping table 420 can be designed to, for example, achieve a target total noise signal power, a target SNR, a minimum total noise signal power, or a maximum SNR, for the corresponding operation condition. For example, a lower multiplication ratio can be set for a high ambient light intensity rather than for a low ambient light intensity. In some examples, instead of having mapping table 420 that maps different operation conditions to different multiplication ratios, gain control module 408 may include a mapping table 430, as shown in FIG. 4D, that maps different operation conditions to different photodetector settings (e.g., different reverse-biased voltages, or bias currents), with each setting corresponding to a particular multiplication ratio. With such arrangements, gain control module 408 can directly retrieve a particular photodetector setting based on the operation condition, and configure the photodetector with the retrieved photodetector setting.

FIG. 5A-FIG. 5D illustrate example mechanisms by which gain control module 408 can obtain information of the operation condition. In one example, as shown in FIG. 5A, gain control module 408 can include a noise measurement module 502 to measure the noise signal power at the output of receiver 204. For example, processing engine 210 may perform FFT to extract frequency contents, and/or filtering operation, on the output of receiver 204 to generate processed output, and noise measurement module 502 can perform measurement of noise signal power based on the amplitude of the processed output. In some examples, noise measurement module 502 can also perform the measurement directly on the output from receiver 204.

Referring to FIG. 5B, which illustrates graphs 220 and 222 of FIG. 2A, controller 406 can control gain control module 408 to measure signal power at the output of receiver 204 prior to, for example, transmitter 202 transmitting light signal 108 (e.g., before time T0), or before an expected time when receiver 204 receives reflected signal 110 (e.g., before time T3), such that the receiver output does not include the reflected signal and only includes noise signal.

Gain control module 408 can then determine the multiplication noise power of the noise signal by subtracting away a pre-determined estimate of the electronic noise. For example, gain control module 408 can store an estimate of the electronic noise of amplifier 240. The gain control module can then infer the ambient light intensity from the multiplication noise power based on Equation 5 above, and retrieve the photodetector setting from the mapping tables 420 and 430 based on the inferred ambient light intensity. In some examples, as shown in FIG. 5C, gain control module 408 can include a mapping table 504 that maps different multiplication noise signal powers (or different total noise signal powers) measured by noise measurement module 502 to different photodetector settings. With such arrangements, gain control module 408 can directly retrieve a particular photodetector setting from mapping table 504 based on the noise signal power measured from the receiver output without inferring ambient light intensity.

In some examples, as shown in FIG. 5D, controller 406 can be coupled with an ambient light sensor 506. From ambient light sensor 506, gain control module 408 can obtain measurements of the ambient light intensity, and retrieve the photodetector setting from the mapping tables of FIG. 4C-FIG. 4D based on the measurements.

In some examples, in addition to ambient light intensity, gain control module 408 can adjust the multiplication ratio of the photodetector based on other measured performance parameters of LiDAR module 102, such as a false alarm rate, a probability of detection, a distance measurement accuracy. Gain control module 408 can implement a closed-loop control mechanism to dynamically adjust the multiplication ratio based on these measured parameters.

Method

Figure 6:
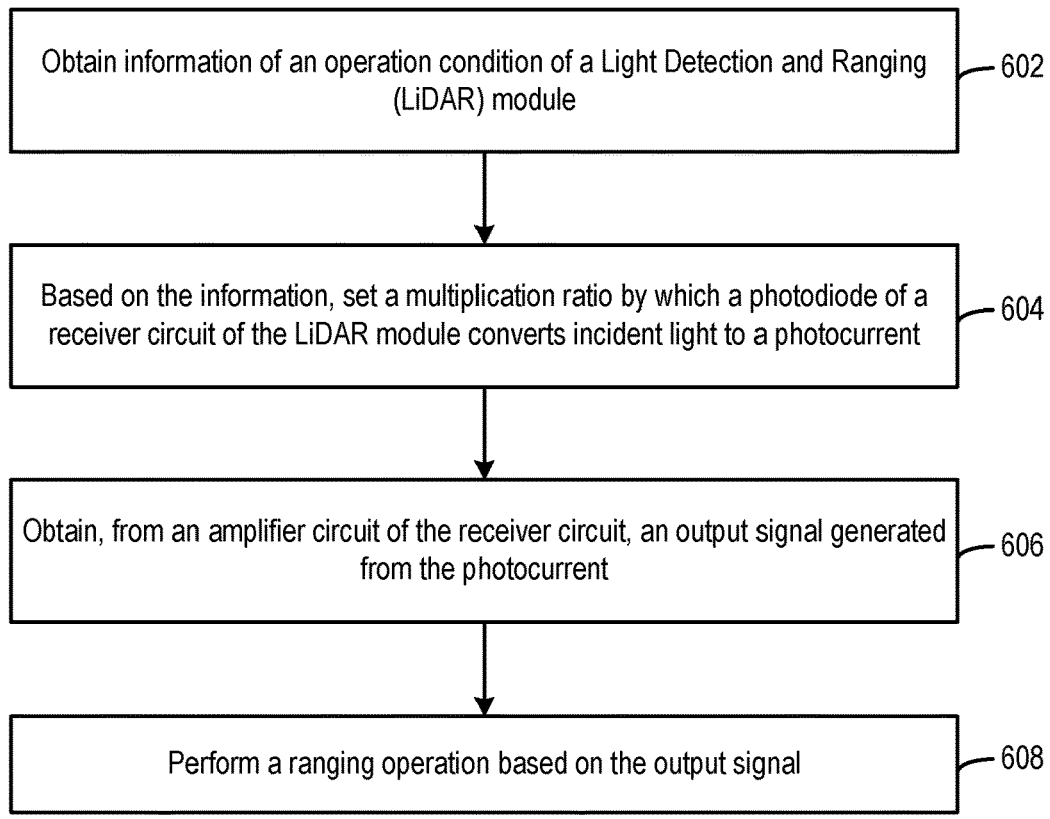
FIG. 6 illustrates a flowchart of a method for performing a ranging operation, according to examples of the present disclosure.

FIG. 6 illustrates a flowchart 600 of a method of performing a ranging operation. Method 600 can be performed by controller 406 of FIG. 4A-FIG. 5D in conjunction with other components of LiDAR module 102 including, for example, transmitter 202 and receiver 204. Transmitter 202 may include, for example, a light source to transmit a varying light signal, such as a light pulse. Receiver 204 may include a photodetector, such as an avalanche photodiode, that converts detected light to a photocurrent according to a multiplication ratio set by the controller, as well as an amplifier circuit to convert the photocurrent into a voltage output. An example of receiver 204 is illustrated in FIG. 2B. Prior to the start of method 600, controller 406 may control transmitter 202 to transmit one or more light pulses, such as one or more first light signals 108.

In step 602, gain control module 408 can obtain information of an operation condition of the LiDAR module. The information of operation condition may indicate, for example, an intensity of the ambient light received by the receiver. The operation condition may reflect the relative contributions of the photodetector's multiplication noise and the amplifier circuit's electronic noise to the total noise at the output of the receiver.

There are various ways by which the gain control module obtains the information of the operation condition. In one example, as shown in FIG. 5A and FIG. 5B, the gain control module can measure the noise signal power at the receiver output, which can reflect the ambient light intensity. The gain control module can measure the noise signal power based on measuring the signal power of the receiver output prior to, for example, the transmitter transmitting the light pulse, the receiver receiving the return pulse, etc., such that the receiver output does not include the return pulse and only includes the noise signal. The gain control module can then determine the multiplication noise power of the noise signal by subtracting away a predetermined estimate of the electronic noise. The gain control module can then infer the ambient light intensity from the multiplication noise power, and retrieve the photodetector setting from the mapping table based on the inferred ambient light intensity. In addition, in some examples the controller can also be coupled with an ambient light sensor. From the ambient light sensor, the gain control module can obtain measurements of the ambient light intensity.

In step 604, gain control module 408 can, based on the information, set the multiplication ratio of the photodetector. For example, in a case where the information indicate that the LiDAR module operates in a strong ambient light environment, the total noise signal power at the receiver output may be dominated by the multiplication noise of the photodetector, and the multiplication ratio can be decreased to reduce the total noise signal power and to improve SNR. On the other hand, if the information indicate that the LiDAR module operates in a low ambient light environment, the multiplication ratio can be increased.

Specifically, as shown in FIG. 4C and FIG. 4D, the gain control module can include a mapping table that maps different multiplication ratios to different operation conditions such as different ambient light intensities. Based on the information of the operation condition of the LiDAR module, the gain control module can refer to the mapping table to retrieve the multiplication ratio setting, and set the multiplication ratio based on the retrieved setting. Each multiplication ratio in the mapping table can be designed to, for example, achieve a target total noise signal power or a target SNR, achieve a minimum total noise signal power or a maximum SNR for the corresponding operation condition. The setting of the multiplication ratio can be based on, for example, setting a reversed-bias voltage across the photodiode, a bias current of the photodiode, etc. In some examples, as shown in FIG. 4D, the mapping table can map different operation conditions to different photodetector settings (e.g., different reverse-biased voltages and/or bias currents), such that the gain control module can directly retrieve a particular photodetector setting based on the operation condition and configure the photodetector using the retrieved photodetector setting.

In step 606, gain control module 408 can obtain, from amplifier circuit 240 of transmitter 204, an output signal generated from the photocurrent. For example, amplifier circuit 240 can include a transimpedance amplifier (TIA) which can convert the photocurrent into a voltage output.

In step 608, ranging operation module 212 can perform a ranging operation based on the output signal. For example, ranging operation module 212 can extract amplitude and/or frequency components of the received signals to detect the reflected first light signals 108 (second light signals 110). If second light signals 110 are detected, a distance between the LiDAR module and the object can be determined based on time difference(s) between the transmission time(s) of the one or more first light signals 108 and the reception time(s) of the one or more second light signals 110.

Computing System

Figure 7:
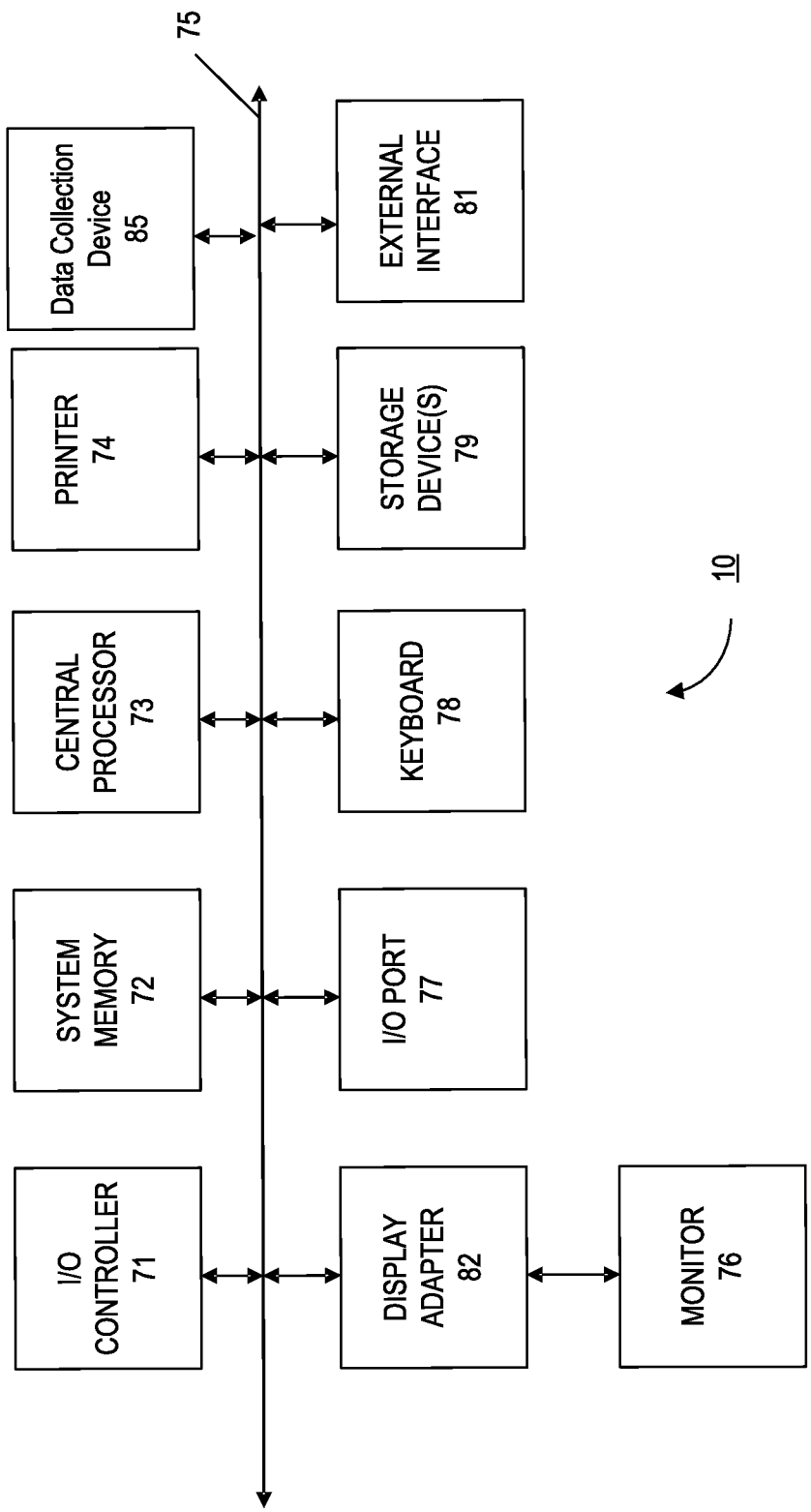
FIG. 7 illustrates an example computing system that may be utilized to implement techniques disclosed herein.

Any of the computing systems mentioned herein may utilize any suitable number of subsystems. Examples of such subsystems are shown in FIG. 7 in computing system 10. In some embodiments, a computing system includes a single computing apparatus, where the subsystems can be the components of the computing apparatus. In other embodiments, a computing system can include multiple computing apparatuses, each being a subsystem, with internal components. Computing system 10 can include, for example, a field programmable gate array (FPGA), an application specific integrated circuit (ASIC), and a general purpose central processing unit (CPU), to implement the disclosed techniques, including the techniques described from FIG. 1-FIG. 6, such as controller 406. In some examples, computing system 10 can also include desktop and laptop computers, tablets, mobile phones, and other mobile devices.

The subsystems shown in FIG. 7 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computing system by any number of means known in the art, such as input/output (I/O) port 77 (e.g., USB, FireWire). For example, I/O port 77 or external interface 81 (e.g. Ethernet or Wi-Fi) can be used to connect computing system 10 to a wide area network such as the Internet, a mouse input device, or a scanner. The interconnection via system bus 75 allows the central processor 73, which can be an FPGA, an ASIC, a CPU, etc., to communicate with each subsystem and to control the execution of a plurality of instructions from system memory 72 or the storage device(s) 79 (e.g., a fixed disk, such as a hard drive or optical disk), as well as the exchange of information between subsystems. The system memory 72 and/or the storage device(s) 79 may embody a computer-readable medium. Another subsystem is a data collection device 85, such as a camera, microphone, accelerometer, and the like. Any of the data mentioned herein can be output from one component to another component and can be output to the user.

A computing system can include a plurality of the same components or subsystems, e.g., connected together by external interface 81 or by an internal interface. In some embodiments, computing systems, subsystems, or apparatuses can communicate over a network. In such instances, one computer can be considered a client and another computer a server, where each can be part of a same computing system. A client and a server can each include multiple systems, subsystems, or components.

Aspects of embodiments can be implemented in the form of control logic-using hardware (e.g., an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language, such as, for example, Java, C, C++, C#, Objective-C, Swift, or scripting language such as Perl or Python using, for example, conventional or object-oriented techniques. The software code may be stored as a series of instructions or commands on a computer-readable medium for storage and/or transmission. A suitable non-transitory computer-readable medium can include random access memory (RAM), a read-only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium may be created using a data signal encoded with such programs. Computer-readable media encoded with the program code may be packaged with a compatible device or provided separately from other devices (e.g., via Internet download). Any such computer-readable medium may reside on or within a single computer product (e.g. a hard drive, a CD, or an entire computing system), and may be present on or within different computer products within a system or network. A computing system may include a monitor, printer, or other suitable display for providing any of the results mentioned herein to a user.

Any of the methods described herein may be totally or partially performed with a computing system including one or more processors, which can be configured to perform the steps. Thus, embodiments can be directed to computing systems configured to perform the steps of any of the methods described herein, potentially with different components performing respective steps or a respective group of steps. Although presented as numbered steps, steps of methods herein can be performed at the same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a," "an," and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus, the apparatus being part of a Light Detection and Ranging (LiDAR) module of a vehicle and comprising:
    a receiver circuit including a photodiode and an amplifier circuit; and
    a controller configured to:
    obtain an ambient light intensity;
    based on the ambient light intensity, set a multiplication ratio by which the photodiode converts incident light to a photocurrent;
    obtain, from the amplifier circuit, an output signal based on the photocurrent; and
    perform a ranging operation based on the output signal;
    wherein the controller is further configured to set the multiplication ratio to a first ratio based on the ambient light intensity within a first intensity range, and set the multiplication ratio to a second ratio based on the ambient light intensity within a second intensity range.

2. The apparatus of claim 1, wherein the controller is further configured to:
    control a light source of the LiDAR module to transmit a first light signal;
    detect, from the output signal of the amplifier circuit, a second light signal reflected by an object from the first light signal;
    measure a time difference between when the first light signal is transmitted by the light source and when the second light signal is received by the receiver circuit; and
    determine a distance between the apparatus and the object based on the time difference.

3. The apparatus of claim 1, wherein the controller is further configured to:
    control a light source of the LiDAR module to transmit multiple first light signals;
    detect, from the output signal of the amplifier circuit, multiple second light signals reflected by an object from the multiple first light signals;
    measure multiple time differences between when the multiple first light signals are transmitted by the light source and when the multiple second light signals are received by the receiver circuit; and
    determine a distance between the apparatus and the object based on the multiple time differences.

4. The apparatus of claim 1,
    wherein the first intensity range is lower than the second intensity range; and
    wherein the first ratio is larger than the second ratio.

5. The apparatus of claim 1, wherein the controller has access to a mapping table that maps ambient light intensities to different multiplication ratios; and
    wherein the controller is configured to retrieve the multiplication ratio from the mapping table based on the ambient light intensity.

6. The apparatus of claim 5, wherein each multiplication ratio in the mapping table is determined to achieve at least one of: a target signal-to-noise ratio (SNR) for ambient light intensity, or a maximum SNR for the ambient light intensity.

7. The apparatus of claim 1, wherein the controller has access to a mapping table that maps different operation conditions to different settings of the photodiode, each setting corresponding to a multiplication ratio; and wherein the controller is configured to:
  retrieve a setting from the mapping table based on the ambient light intensity; and
  configure the receiver circuit based on the setting to set the multiplication ratio.

8. The apparatus of claim 7, wherein the setting comprises at least one of:
  a reverse-biased voltage across the photodiode, or a bias current of the photodiode.

9. The apparatus of claim 1, wherein the controller is configured to obtain the ambient light intensity from one or more sensors.

10. The apparatus of claim 1, wherein the photodiode comprises at least one of:
  an avalanche photodiode (APD), a P-I-N diode, a single photodiode avalanche photodiode (SPAD), or a silicon photomultiplier (SiPM).

11. A method comprising:
  obtaining, in a Light Detection and Ranging (LiDAR) module, an ambient light intensity;
  based on the ambient light intensity, setting a multiplication ratio by which a photodiode of a receiver circuit of the LiDAR module converts incident light to a photocurrent;
  obtaining, from an amplifier circuit of the receiver circuit, an output signal generated from the photocurrent; and
  performing a ranging operation based on the output signal;
  wherein setting the multiplication ratio comprises:
  setting the multiplication ratio to a first ratio based on the ambient light intensity within a first intensity range; and
  setting the multiplication ratio to a second ratio based on the ambient light intensity within a second intensity range.

12. The method of claim 11, further comprising:
  controlling a light source of the LiDAR module to transmit a first light signal;
  detecting, from the output signal of the amplifier circuit, a second light signal reflected by an object from the first light signal; and
  determining a distance between the LiDAR module and the object based on the first light signal and the second light signal.

13. The method of claim 11,
  wherein the first intensity range is lower than the second intensity range; and
  wherein the first ratio is larger than the second ratio.

* * * * *